2,853,474
NEW LACTONE

Reginald John William Reynolds and Edward Jervis Vickers, Manchester, England, assignors to Imperial Chemical Industries Limited, London, England, a corporation of Great Britain No Drawing. Application August 23, 1955
Serial No. 530,200

Claims priority, application Great Britain August 4, 1955

3 Claims. (Cl. 260—78.3)

This invention relates to a new lactone useful for the manufacture of polyesters and to its manufacture.

According to the invention there is provided $\alpha$:$\alpha$-bis-(chloromethyl)-$\beta$-propiolactone.

The $\alpha$:$\alpha$-bis-(chloromethyl)-$\beta$-propiolactone is a low-melting solid of M. P. 35–36° C. obtainable by decomposing salts of $\beta$:$\beta'$:$\beta''$-trichloropivalic acid and then isolating the lactone, for example by stirring a neutral solution of the sodium salt in water in presence of a water-immiscible solvent such as benzene or chloroform, and then recovering the lactone from its solution in the water-miscible solvent or by dry distillation of anhydrous salts of $\beta$:$\beta'$:$\beta''$-trichloropivalic acid, when practically pure lactone is obtained as the distillate. Silver and lead salts of $\beta$:$\beta'$:$\beta''$-trichloropivalic acid are particularly advantageous to use, in that the yields of $\alpha$:$\alpha$-bis-(chloromethyl)-$\beta$-propiolactone so obtained are practically quantitative.

Polyesters having the structural unit:

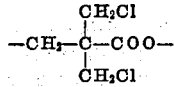

may be made by polymerising $\alpha$:$\alpha$-bis-(chloromethyl)-$\beta$-propiolactone, advantageously in presence of catalysts for the polymerisation.

As catalysts there may be used, for example acids such as sulphuric acid or bases such as the alkali-metal hydroxides or alkoxides, and tertiary amines such as triethylamine, dimethylaniline, N:N:N′:N′-tetramethylhexamethylenediamine or hexamethylenetetramine. Friedel-Crafts catalysts and their complexes, for example ferric chloride, aluminium chloride and boron trifluoride diethyl etherate may be used. Certain salts which are able to react with the $\beta$-lactone after the manner

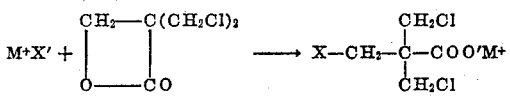

where M+ is a metal cation and X′ the accompanying anion, for example salts of carboxylic acids, or metal phenoxides, are also useful catalysts. Quaternary ammonium compounds may also be used with particular advantage where the corresponding metal compounds are characterised by low solubility in the monomeric $\alpha$:$\alpha$-bis-(chloromethyl)-$\beta$-propiolactone; thus for example quaternary ammonium halides are generally much more effective as catalysts than the corresponding alkali metal halides. These catalysts are used in small amount, preferably from about 0.01 to 0.50 molar percent.

The polymerisation may be carried out, if desired, in the presence of inert solvents or diluents. Examples of such solvents or diluents, which are inert to $\alpha$:$\alpha$-bis-(chloromethyl)-$\beta$-propiolactone, are cyclohexane, toluene, chlorobenzene, nitrobenzene and acetonitrile.

The temperature of polymerisation depends upon the activity of the catalyst. Also, if solvents or diluents are not used, it is preferred that polymerisation be carried out at a temperature above the melting point of the $\alpha$:$\alpha$-bis-(chloromethyl)-$\beta$-propiolactone. In general temperatures between 0° and 100° C. have been found suitable.

The presence of water during polymerisation may in some cases be detrimental to the production of high molecular weight polymers; for example, when tertiary amines are employed as catalysts, the presence of relatively small amounts of water leads to the formation of lower molecular weight products. Accordingly, in general, where high molecular weight polymers are desired anhydrous conditions are preferred.

When only low molecular weight polymers are desired, these may be obtained directly from salts of $\beta$:$\beta'$:$\beta''$-trichloropivalic acid. For example, from aqueous solutions of such salts, particularly concentrated solutions either at room temperature or at elevated temperatures, polymer is deposited directly after about an hour at room temperature, or more rapidly at elevated temperatures. When such low molecular weight polymers are heated above the melting point, further condensation takes place, the melt becomes more viscous, and on cooling solidifies to give a glassy resin.

The polyesters may contain other structural units in addition to the unit:

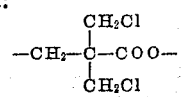

Such polyesters may be made, for example, by copolymerisation of $\alpha$:$\alpha$-bis-(chloromethyl)-$\beta$-propiolactone with other $\beta$-lactones having the general formula:

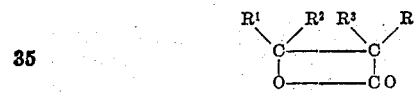

where R¹,R²,R³ and R⁴ may be hydrogen or hydrocarbon residues, for example $\beta$-propiolactone, $\alpha$-methyl-$\beta$-propiolactone, $\alpha$-ethyl-$\beta$-methyl-$\beta$-propiolactone, $\beta$:$\beta$-dimethyl-$\beta$-propiolactone, and $\alpha$:$\alpha$-diphenyl-$\beta$-propiolactone. When high molecular weight polymers are required it is preferred that at least R³ and R⁴ be hydrocarbon residues. Particularly useful polymers are obtained by copolymerisation of $\alpha$:$\alpha$-bis-(chloromethyl)-$\beta$-propiolactone with $\alpha$:$\alpha$-dimethyl-$\beta$-propiolactone.

Besides $\beta$-lactones, other polymerisable cyclic esters may be used in copolymerisation with $\alpha$:$\alpha$-bis-(chloromethyl)-$\beta$-propiolactone, for example diglycollide.

The polyesters, including co-polyesters, are particularly useful for the manufacture of moulded articles, fibres and films. A particular feature of polymers containing in major amount the structural unit:

is their high melting point. Hitherto aliphatic polyesters have generally been characterised by comparatively low melting points.

The invention is illustrated but not limited by the following examples in which the parts and percentages are by weight:

Example 1

The anhydrous, finely-powdered silver salt of $\beta$:$\beta'\beta''$-trichloropivalic acid is heated cautiously in an oil-jacketed distillation unit in a slow stream of nitrogen at a pressure of 0.2–0.3 mm. of mercury. A liquid begins to distil slowly when the jacket temperature reaches 105° C. and somewhat more rapidly when the temperature reaches 110° C. The liquid distillate soon begins to crystallise in the receiver. The jacket temperature is maintained between 110° C. and 115° C. until distillation slackens and is then raised slowly to 150° C. Very little further distillation occurs above a jacket temperature of 125° C. The solid distillate is collected and consists of practically pure α:α-bis-(chloromethyl)-β-propiolactone melting at 35–36° C. The melting point is unchanged after recrystallisation from a mixture of n-hexane and benezene. Elementary analysis gives a figure of 42.4% for chlorine content (theory 42.0%).

When the α:α-bis-(chloromethyl)-β-propiolactone so obtained is heated above its melting point with a trace amount of pyridine, rapid polymerisation occurs to give a polymer which shows some signs of sintering at 250° C. but only melts completely at about 295° C.

*Example 2*

The anhydrous finely powdered lead salts of β:β′:β″-trichloropivalic acid is heated cautiously in an oil-jacketed distillation unit in a slow stream of nitrogen at a pressure of 0.3–0.4 mm. of mercury. A liquid distillate, which crystallises in the cold receiver, begins to appear when the jacket temperature reaches about 165° C. The temperature is raised further to about 195° C. and is maintained at between 195–200° C. until distillation ceases. The solid distillate in the receiver is dissolved in dry, thiophene-free benzene, the solution is filtered from a small amount of solid polymer and then concentrated by distillation under reduced pressure until the product starts to crystallise. n-Hexane is added with stirring to aid the further separation of product and the large crystals of α:α-bis-(chloromethyl)-β-propiolactone are then collected by filtration and dried. The melting point is 36° C.

*Example 3*

135 parts of α:α-bis-(chloromethyl)-β-propiolactone are heated to 40° C. out of contact with the moist atmosphere until completely molten and 1 part of a 13% solution of N:N:N′:N′-tetramethylhexamethylenediamine in dry benzene is then added with stirring. The liquid mixture quickly becomes turbid owing to separation of polymer and after about 3 minutes rapidly solidifies with evolution of much heat. The product is heated to 50° C. and heating is continued for a further 5 hours at 50° C. The product is finally heated at 100° C. for one hour in a slow stream of nitrogen at a pressure of 0.1 mm. of mercury to remove benzene and trace amounts of any other volatile materials. The white solid polymer so obtained has a softening point of about 280° C.

*Example 4*

150 parts of α:α-bis-(chloromethyl)-β-propiolactone is heated to 40° C. out of contact with atmospheric moisture until completely molten and 0.1 part of finely powdered potassium hydroxide is then added with stirring. Heating and stirring are continued at 40° C. for about 15 minutes and then the mixture is heated to 50° C. The mixture soon becomes turbid owing to separation of polymer and within 2 hours is completely solid. Heating is continued without agitation for a further 4 hours at 50° C. and the product is then finally heated at 100° C. in a slow stream of nitrogen at a pressure of 0.1 mm. of mercury to remove traces of volatile material. The product is a tough, white solid polymer which has a softening point of about 302° C. and gives a viscous melt from which may be spun filaments which are capable of being cold-drawn.

What we claim is:

1. Resinous polyesters having the recurring structural unit

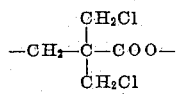

2. A resinous homopolymer of α:α-bis-(chloromethyl)-β-propiolactone having the recurring structural unit

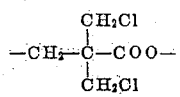

3. A process for preparing a resinous polyester having the recurring structural unit

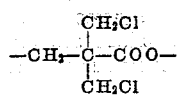

which comprises polymerizing α:α-bis-(chloromethyl)-β-propiolactone at a temperature between 0° and 100° C., and under substantially anhydrous conditions, said polymerization being carried out in the presence of from about 0.01 to 0.50 molar percent of a condensation polymerization catalyst.

References Cited in the file of this patent
UNITED STATES PATENTS

| | | |
|---|---|---|
| 1,849,107 | Moss | Mar. 15, 1932 |
| 2,580,714 | Young | Jan. 1, 1952 |
| 2,585,223 | Caldwell | Feb. 12, 1952 |
| 2,658,055 | Alderson | Nov. 3, 1953 |